Aug. 18, 1936.    J. J. MURPHY    2,051,147
AUTOMATIC VALVE
Filed May 17, 1935
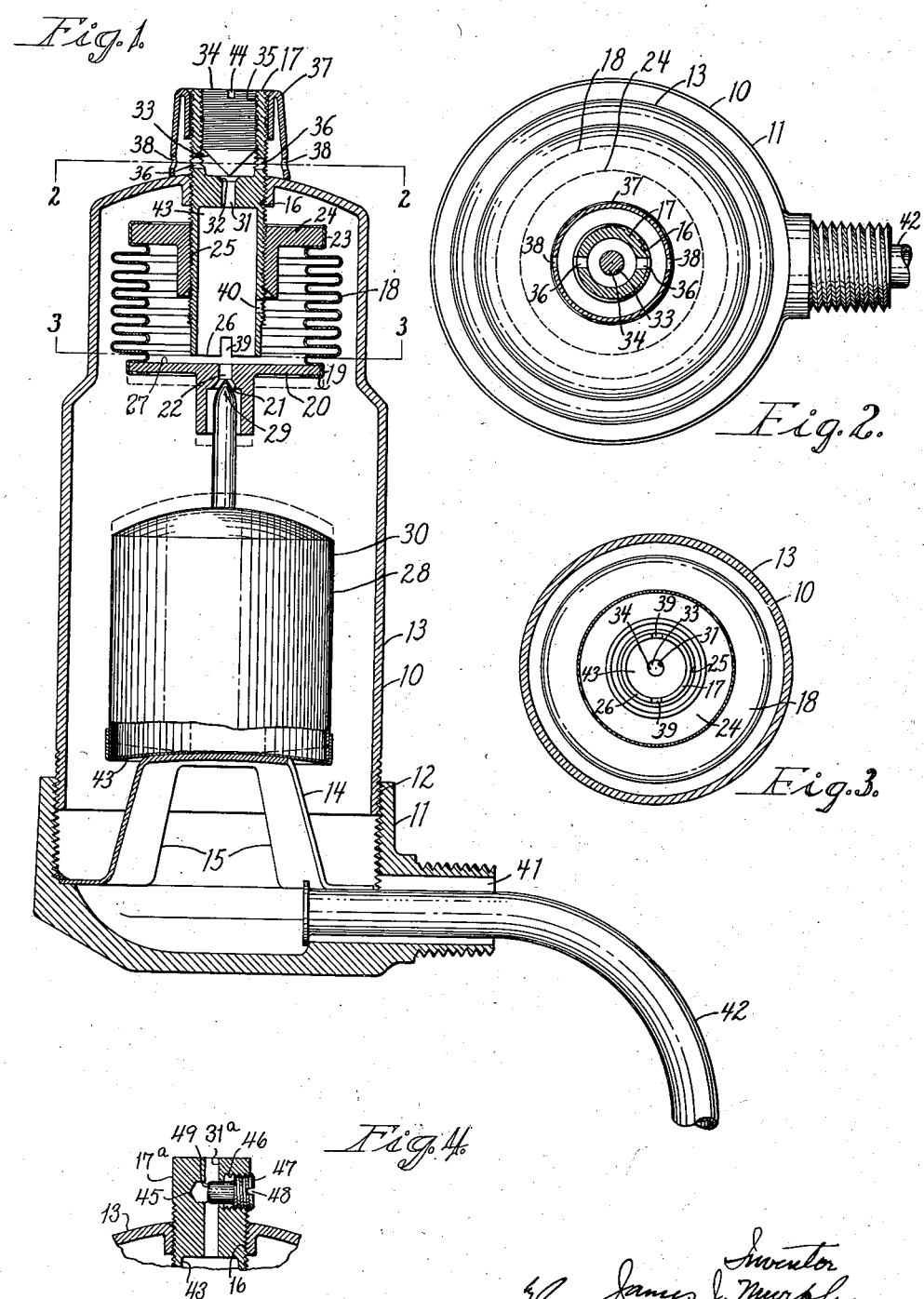

Patented Aug. 18, 1936

2,051,147

UNITED STATES PATENT OFFICE 2,051,147

AUTOMATIC VALVE

James J. Murphy, New Haven, Conn.

Application May 17, 1935, Serial No. 21,930

6 Claims. (Cl. 236—61)

This invention relates to improvements in automatic valves, and more particularly to automatic valves commonly known as air and vacuum valves.

One object of this invention is to provide an improved air and vacuum valve that vents air freely from the radiator and that is sensitive to a small variation of air-pressure, so that the valve promptly seals against reentrance of air through the valve.

Another object of this invention is to provide an improved air and vacuum valve employing a bellows for sealing against reentrance of air, which bellows is so combined in the valve as to provide capacity within itself for condensation water, to minimize the tendency of condensation water to spurt or leak out the air-vent of the valve.

Another object of this invention is to provide an improved air and vacuum valve with manually-adjustable means for the air-vent, to provide for varying the speed of venting air, and thus permit of equalizing or balancing the heating of large and distant radiators with those of smaller size, by regulating the escape of air through the valve, which in turn acts to regulate the speed of the oncoming steam.

Another object of this invention is to provide an improved air and vacuum valve formed of simple elements readily manufactured and readily assembled to produce a durable and efficient construction at minimum cost.

With the above and other objects in view, this invention includes all improvements over the prior art which are disclosed in this application.

In the accompanying drawing, in which certain ways of carrying out the invention are shown for illustrative purposes:

Fig. 1 is an enlarged vertical, central, sectional view of an air and vacuum valve constructed in accordance with this invention;

Fig. 2 is a transverse sectional view on the plane indicated by line 2—2 of Fig. 1;

Fig. 3 is a transverse sectional view on the plane indicated by line 3—3 of Fig. 1; and Fig. 4 is a fragmental view similar to Fig. 1 of a modified construction of the upper end thereof.

In the description and claims, the various parts are identified by specific names for convenience, but they are intended to be as generic in their application as the prior art will permit.

Referring to Figs. 1, 2, and 3 of the drawing, 10 is an air and vacuum valve having a base 11 screw-threadedly connected at 12 to the valve-casing 13, which screw-threaded connection 12 may be rendered steam-tight by sweating or soldering.

A bridge or valve-support 14 is secured in the base 11 in any suitable way as, for example, by soldering the three feet 15 thereof to the base.

The upper end of the casing 13 is provided with a screw-threaded opening 16 in which is screw-threadedly engaged a hollow or tubular support 17 which, after being adjusted to the desired position, may be secured by sweating or soldering the screw-threaded connection at 16.

A metal bellows 18 has its lower end 19 flanged over and soldered or sweated to the lower valve-seat block 20, which has a valve-seat 21 and an opening 22 forming a passage through the valve-block 20. The upper end 23 of the bellows is also flanged over and sweated or soldered to the flanged block-member 24 internally screw-threaded at 25 for screw-threaded engagement with the external screw-threads of the tubular support 17. After the block 24 is adjusted to the desired position on the tubular support 17 to space the lower end 26 of the support 17 a distance of about .035″ from the upper face 27 of the valve-block 20, the threaded connection at 25 is locked in position by sweating or soldering.

A float and heat operated valve 28 having its upper end 29 formed to seat against the valve-seat 21, has the main hollow-chamber part 30 provided with a small amount of ether or such volatile fluid and hermetically sealed, in a manner well known in the art.

The tubular support 17 has a reduced passage 31 and a valve-seat 32 against which valve-seat 32 is adapted to engage the cone-end 33 of a valve 34 screw-threadedly adjustable in the screw-threaded opening 35 in the upper portion of the hollow support 17. One or more holes 36 extend transversely through the wall of the support 17. A cap or shell-member 37 may be engaged on the outside of the upper end of the support 17 in any suitable way as, for example, by being frictionally pressed down therealong. One or more holes 38 extend transversely through the wall of the shell-member 37.

The lower end of the tubular support 17 is provided with one or more slots 39, and above the slots 39 with one or more holes 40 transversely through its wall.

In operation, when steam is turned on in the radiator, to which the valve will ordinarily be connected for use, the usual air and water within the radiator pass through the opening 41 and up past the float-valve 28. If, for example, there is much air but little water passing into the opening 41, then the valve 28 remains at rest in its normal position on the bridge or support 14, thus leaving the valve-seat 21 and passage 22 open, so that the air passes up therethrough and into the bellows, from which it passes in through the opening 40 and through the slots 39 into the inside 43 of the tubular support 17, whereupon it passes out through the passage 31 and holes 36 and 38 to the atmosphere, assuming the screw-valve 34 to be sufficiently open for the purpose.

If, now, water comes in volume sufficient to float the float-valve 28, it causes the latter to rise and force the part 29 against the valve-seat 21, thus closing the valve. When the water has sufficiently lowered by passing out through the usual siphon-tube 42, then the valve 28 again lowers to its position of rest upon the bridge 14, thus opening the valve-part 29 away from the seat 21, whereupon air can continue to pass out through the valve as previously described.

When, finally, the steam comes on and comes in contact with the float-valve 28, it heats the latter and, by causing the ether therein to expand, causes the bottom 43 thereof to be sprung downwardly to the position indicated in dotted lines, whereupon the upper portion 29 of the valve closes against the seat 21 and remains so closed while the steam is on.

When steam is shut off, the valve 28 cools and opens the valve-seat at 21, and the radiator starts to cool and the resulting condensation of steam therein without replenishment of further steam tends to produce a vacuum within the radiator. This vacuum or lowered pressure is transmitted through the valve construction 10, with the result that the atmospheric or outer air-pressure entering through the openings 38, 36, 31, 43, 40, and 39 tends to expand and, therefore, lower the lower end of the bellows 18, to thus move the valve-block 20 with its valve-seat 21 down against the upper valve-portion 29 to close the valve, thus preventing air entering the radiator.

When steam is again turned on in the radiator, any condensed water that enters the valve 10 will be drained out through the siphon-tube 42, as previously described. When, finally, the pressure from the radiator of either air and/or water and/or steam reaches the pressure of the outside atmosphere, the bellows 18 returns up to its normal position, carrying the valve-block 20 up with it. Thus, if there should happen for any reason to be air in the radiator, it will pass out through the valve-opening as has been previously described, and when the steam reaches the float-valve 28 and heats it, the latter will be expanded and again close the valve-portion 29 against its seat 21.

The adjustable screw-valve 34 has a slot 44 suitable for a screw driver, by which the cone-portion 33 can be adjusted toward and from the valve-seat 32 to bring about a carefully-restricted passage, thus permitting of the adjustment of the separate valves 10 on the different radiators of a heating system to meet the requirements encountered in practice. Thus, for example, a radiator that is distant on the heating line will have the screw-valve 34 opened more than a radiator closer to the source of steam, thus equalizing and balancing the heating effect by retarding the escape of air through the radiator near the steam-supply, while permitting air to flow more rapidly through the vent-valve 34 on the radiators far distant, to thus permit the latter radiators to receive steam sooner than the radiators near the source of supply.

In the modified construction shown in Fig. 4, the tubular support 17ª is provided with a vertical annular passage 31ª through the upper end thereof. An annular passage 45, at least as large in diameter as the passage 31ª, extends transversely, centrally through the latter and is concentric with a screw-threaded passage 46 in which threaded passage screw-threadedly engages a screw-valve 47 having a screw-slot 48 and an annular end-portion or valve-stem 49 adapted to completely or partly adjustably close the passage 31ª by adjustment similar to screw-valve 34 of Fig. 1.

The bellows 18 arranged in accordance with this invention acts as a reservoir or capacity for water of condensation. Thus, when water tends to spurt up through the valve-opening 22, the volume capacity of the bellows 18 permits the accumulation of the water without forcing the water up through the tubular support 17 and out through the openings 38 which would be undesirable. As soon as the valve 28 comes to rest in its lowered position to leave the valve-seat 22 open, the accumulated water in the bellows passes through the slots 39 and out through the passage 22 to thus empty the bellows of water.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. An automatic air and vacuum valve construction, including: a float-and-heat-operated valve; a bellows beyond and having a valve-seat in its end nearest, and for said float-and-heat-operated valve, said valve-seat communicating with the interior of said bellows; and said bellows having an opening communicating with the atmosphere.

2. An automatic air and vacuum valve construction, including: a casing; a float-and-heat-operated valve; a bellows beyond said float-and-heat-operated valve and having its end remote from said valve connected to said casing with the opposite end of said bellows movable toward and from, and provided with a valve-seat for said valve, said valve-seat communicating with the interior of said bellows; and said bellows having an opening communicating with the atmosphere.

3. An automatic air and vacuum valve construction, including: a float-and-heat-operated valve; a bellows beyond said valve and having the inner face of its end-wall adjacent said valve substantially flat and horizontal, said end-wall having a valve-seat for said valve and communicating with the interior of said bellows; and said bellows having an opening communicating with the atmosphere.

4. An automatic air and vacuum valve construction, including: a casing; a support connected to the top of the casing and extending down into said casing; a bellows having its upper end connected to said support, and its lower end free to move up and down and provided with a valve-seat communicating with the interior of the bellows; a float-and-heat-operated valve for said valve-seat and located below said bellows;

and said bellows having an opening communicating with the atmosphere.

5. An automatic air and vacuum valve construction, including: a casing; a hollow support connected to the top of the casing and extending down into said casing; a bellows having its upper end connected to said hollow support, and its lower end free to move up and down and provided with a valve-seat communicating with the interior of the bellows; a float-and-heat-operated valve for said valve-seat and located below said bellows; and said bellows having an opening through said hollow support communicating with the atmosphere.

6. An automatic air and vacuum valve construction, including: a casing; a hollow support connected to the top of the casing and extending down into said casing; a bellows having its upper end connected to said hollow support, and its lower end free to move up and down and provided with a valve-seat communicating with the interior of the bellows; a float-and-heat-operated valve for said valve-seat and located below said bellows; said bellows having an opening through said hollow support communicating with the atmosphere; and said hollow support extending down to a position adjacent the inner face of the lower end of said bellows and adapted to limit the upward movement of said lower end of the bellows.

JAMES J. MURPHY.